(12) United States Patent
Davern et al.

(10) Patent No.: US 12,433,179 B2
(45) Date of Patent: Oct. 7, 2025

(54) VEHICLE WITH DETECTION SYSTEM FOR DETECTING GROUND SURFACE AND SUB-SURFACE OBJECTS, AND METHOD FOR CONTROLLING VEHICLE

(71) Applicant: THE TORO COMPANY, Bloomington, MN (US)

(72) Inventors: Michael Ryan Davern, Eagan, MN (US); Rex Ray Bergsten, Burnsville, MN (US)

(73) Assignee: THE TORO COMPANY, Bloomington, MN (US)

( * ) Notice: Subject to any disclaimer, the term of this patent is extended or adjusted under 35 U.S.C. 154(b) by 829 days.

(21) Appl. No.: 17/624,734

(22) PCT Filed: Jul. 30, 2020

(86) PCT No.: PCT/US2020/044165
§ 371 (c)(1),
(2) Date: Jan. 4, 2022

(87) PCT Pub. No.: WO2021/025933
PCT Pub. Date: Feb. 11, 2021

(65) Prior Publication Data
US 2022/0248589 A1    Aug. 11, 2022

Related U.S. Application Data

(60) Provisional application No. 62/889,253, filed on Aug. 20, 2019, provisional application No. 62/883,526, filed on Aug. 6, 2019.

(51) Int. Cl.
*A01B 45/02*    (2006.01)
*A01D 34/00*    (2006.01)
(Continued)

(52) U.S. Cl.
CPC .......... *A01B 45/023* (2013.01); *B60W 50/16* (2013.01); *G01S 13/56* (2013.01); *G01S 13/931* (2013.01);
(Continued)

(58) Field of Classification Search
CPC .. A01B 45/023; A01D 34/863; A01D 34/008; A01D 75/185; H04B 17/318;
(Continued)

(56) References Cited

U.S. PATENT DOCUMENTS 7,339,957 B2   3/2008 Hitt
7,631,813 B1   12/2009 Lichte et al.
(Continued)

FOREIGN PATENT DOCUMENTS

EP    3167699 A1    5/2017
JP    S 60-259115 A    12/1985
(Continued)

OTHER PUBLICATIONS

Japanese Patent Application No. 2022-507568, National Stage entry Feb. 4, 2022; English translation of Notice of Reasons for Rejection issued Mar. 12, 2024; 4 pages.
(Continued)

*Primary Examiner* — Joseph M Rocca
*Assistant Examiner* — Robert E Pezzuto
(74) *Attorney, Agent, or Firm* — Mueting Raasch Group

(57) ABSTRACT

A detection system for use with a powered ground maintenance vehicle, the detection system adapted to detect and avoid contact of a ground maintenance implement carried by the vehicle with an object associated with the ground surface. In some embodiments, the detection system may automatically disengage the implement from the ground surface before the implement contacts the object and,
(Continued)

optionally, automatically re-engage the implement with the ground surface after the implement has passed the object.

10 Claims, 11 Drawing Sheets

(51) Int. Cl.
| | |
|---|---|
| *B60W 10/08* | (2006.01) |
| *B60W 50/16* | (2020.01) |
| *G01S 13/56* | (2006.01) |
| *G01S 13/931* | (2020.01) |
| *G06K 19/07* | (2006.01) |
| *H01Q 1/32* | (2006.01) |
| *H04B 17/318* | (2015.01) |
| *B60W 50/14* | (2020.01) |

(52) U.S. Cl.
CPC ....... *G06K 19/0723* (2013.01); *H01Q 1/3233* (2013.01); *H04B 17/318* (2015.01); *B60W 2050/143* (2013.01); *B60W 2050/146* (2013.01); *B60W 2420/408* (2024.01)

(58) Field of Classification Search
CPC ...... H01Q 1/3233; B60W 50/16; G01S 13/56; G01S 13/931; G06K 19/0723
See application file for complete search history.

(56) References Cited

U.S. PATENT DOCUMENTS

| | | | |
|---|---|---|---|
| 8,104,993 B2 | 1/2012 | Hitt et al. | |
| 10,869,432 B2 | 12/2020 | Wykman et al. | |
| 10,959,362 B2 | 3/2021 | Frodigh et al. | |
| 2006/0059880 A1* | 3/2006 | Angott | A01D 34/008 56/10.2 A |
| 2010/0314142 A1 | 12/2010 | Keane et al. | |
| 2011/0166705 A1* | 7/2011 | Anderson | A01D 75/185 901/50 |
| 2016/0113195 A1 | 4/2016 | Das et al. | |
| 2017/0131718 A1 | 5/2017 | Matsumura et al. | |
| 2018/0213731 A1* | 8/2018 | Wykman | A01C 21/007 |
| 2019/0064345 A1 | 2/2019 | Reed et al. | |
| 2019/0382005 A1 | 12/2019 | Nishi et al. | |
| 2019/0389519 A1 | 12/2019 | Bergsten et al. | |
| 2020/0050208 A1 | 2/2020 | Frick et al. | |
| 2020/0375091 A1* | 12/2020 | Kuriyagawa | A01D 34/54 |
| 2020/0396887 A1 | 12/2020 | Frodigh et al. | |
| 2020/0396892 A1 | 12/2020 | Frodigh et al. | |
| 2021/0015023 A1 | 1/2021 | Frodigh et al. | |
| 2021/0195834 A1 | 7/2021 | Arendt et al. | |
| 2022/0295708 A1 | 9/2022 | Voelp, IV et al. | |

FOREIGN PATENT DOCUMENTS

| | | |
|---|---|---|
| JP | S 63-145406 U | 9/1988 |
| JP | H01-160014 U | 11/1989 |
| JP | 2011-062115 A | 3/2011 |
| JP | 2018-121594 A | 8/2018 |
| WO | 2017148792 A1 | 9/2017 |
| WO | 2018135256 A1 | 7/2018 |
| WO | 2019068175 A1 | 4/2019 |
| WO | 2020257786 A1 | 12/2020 |
| WO | 2020257792 A1 | 12/2020 |
| WO | 2020257796 A1 | 12/2020 |
| WO | 2020257798 A1 | 12/2020 |
| WO | 2021025933 A1 | 2/2021 |
| WO | 2022010684 A1 | 1/2022 |

OTHER PUBLICATIONS

Conner-Simons, A., "MIT researchers look under the road to aid self-driving cars," MIT News, Feb. 24, 2020, Retrieved from Internet: <https://www.therobotreport.com/mit-researchers-look-under-the-road-to-aid-self-driving-cars/>, 4 pages.
Cornick et al., "Localizing Ground Penetrating RADAR: A Step Toward Robust Autonomous Ground Vehicle Localization," Journal of Field Robotics, 2016, vol. 33, No. 1, 82-102.
Toro, "Outcross 9060: Turf Utility Vehicle," Product Brochure, The Toro Company, Bloomington, MN, USA, 2019, 3 pages.
Wikipedia, "IEEE 802.11," wikipedia.org, Retrieved on May 1, 2023, Retrieved from Internet: <https://en.wikipedia.org/wiki/IEEE_802.11>, 20 pages.
U.S. Appl. No. 62/883,526, Davern et al., filed Aug. 6, 2019.
U.S. Appl. No. 62/889,253, Davern et al., filed Aug. 20, 2019.
International Patent Application No. PCT/US2020/044165, filed Jul. 30, 2020, ISA International Search Report and Written Opinion, dated Nov. 12, 2020; 12 pages.
International Patent Application No. PCT/US2020/044165, filed Jul. 30, 2020, IPEA International Preliminary Report on Patentability, dated Jul. 29, 2021; 22 pages.

* cited by examiner

VEHICLE WITH DETECTION SYSTEM FOR DETECTING GROUND SURFACE AND SUB-SURFACE OBJECTS, AND METHOD FOR CONTROLLING VEHICLE

This application is a 35 U.S.C. § 371 U.S. National Stage of International Application No. PCT/US2020/044165, filed Jul. 30, 2020, which claims priority to and/or the benefit of U.S. Provisional Patent Application Numbers: 62/889,253, filed Aug. 20, 2019; and 62/883,526, filed Aug. 6, 2019, wherein each of the documents identified in this paragraph is incorporated herein by reference in its entirety.

Embodiments of the present disclosure are related to vehicles carrying ground maintenance implements and, more particularly, to systems and methods for controlling the vehicle while detecting ground surface and sub-surface objects such as sprinkler heads during ground maintenance operations.

BACKGROUND

Soil and turf treating machines are well-known for promoting turf health. For example, turf aerators are used to create perforations in a turf surface. Such perforations allow water, air, and nutrients to reach grass roots more effectively. Aeration may be especially beneficial in areas where high soil compaction is common.

While various methods of forming soil perforations are known, one common method involves the use of a set of penetrating coring tines that are driven into the soil surface during operation. Some aerators utilize tubular coring tines that, when withdrawn, extract a "plug" of soil, leaving a perforation in its place. The soil core may be ejected onto the turf, where it eventually breaks down. Other aerators may utilize solid tines.

While highly effective for their intended purpose, coring tines can damage items at or near the turf surface. For instance, irrigation sprinkler heads can sustain substantial damage if contacted by a coring tine. Accordingly, aerator operators typically monitor surroundings areas during aeration to prevent traversing, and damaging, sprinkler heads with the aeration tines. Such active monitoring may decrease aerating efficiency, especially when the operator is inexperienced or unfamiliar with the property.

SUMMARY

Embodiments described herein may provide detection systems and methods that automatically detect ground surface or sub-surface objects prior to potential contact with an implement (e.g., aerator coring tine) associated with a vehicle. In some embodiments, the system may communicate with other systems of the vehicle to allow the vehicle to automatically avoid contact of the implement with the object.

According to a first aspect of the present disclosure, a powered ground maintenance vehicle is provided. The vehicle includes: a chassis supported upon a ground surface by ground contact members; a prime mover attached to the chassis; and a traction drive system powered by the prime mover and adapted to selectively power one or more of the ground contact members to propel the vehicle over the ground surface. The vehicle also includes a maintenance implement carried by the chassis, and a detection system adapted to monitor a detection zone forward of the implement. The detection system is further adapted to detect an object at near the ground surface that passes through the detection zone as the vehicle traverses the ground surface. The detection system is adapted to issue a notification indicative of a location of the object prior to the implement contacting the object.

In a second aspect according to the first aspect, the vehicle further includes an electronic controller adapted to communicate with the detection system, wherein the controller is adapted to issue the notification. In a third aspect according to either one of the first and second aspects, the vehicle further include an implement engagement system adapted to automatically disengage the implement from the ground surface in response to receiving the notification. In a fourth aspect according to any one of the previous aspects, the notification includes one or more of a visual, tactile, or audible notification to an operator controlling the vehicle.

In a fifth aspect, a powered ground maintenance vehicle is provided that includes: a chassis supported upon a ground surface by ground contact members; a prime mover attached to the chassis; a traction drive system powered by the prime mover and adapted to selectively power one or more of the ground contact members to propel the vehicle over the ground surface; and a ground maintenance implement carried by the chassis. The vehicle further includes an implement engagement system connecting the implement to the chassis, wherein the engagement system is adapted to selectively engage the implement with, and disengage the implement from, the ground surface. The vehicle also includes a detection system adapted to monitor a detection zone forward of the implement and detect an object passing through the detection zone as the vehicle traverses the ground surface. The detection system is further adapted to periodically capture object information associated with the object while the object remains in the detection zone. The vehicle also includes an electronic controller supported by the chassis and in communication with both the detection system and the engagement system. The controller is adapted to receive the object information and estimate a time, based upon vehicle ground speed, when the implement will reach the object, and wherein the controller is further adapted to issue a notification to disengage the implement from the ground surface before the implement contacts the object.

In a sixth aspect according to the fifth aspect, the controller is adapted to issue the notification to the implement engagement system, and wherein the implement engagement system is adapted to automatically raise or otherwise disengage the implement from the ground surface before contact of the implement with the object. In a seventh aspect according to either the fifth or sixth aspect, the controller is adapted to command the implement engagement system to automatically lower or otherwise engage the implement with the ground surface after the implement passes the object. In an eighth aspect according to any one of the fifth through seventh aspects, the implement comprises a turf aerator. In a ninth aspect according to any one of the fifth through eighth aspects, the object comprises an irrigation sprinkler head. In a tenth aspect according to any one of the fifth through ninth aspects, the detection system comprises an RFID antenna secured to the vehicle, wherein the RFID antenna is adapted to detect an RFID tag located on or near the object. In an eleventh aspect according to any one of the fifth through ninth aspects, the detection system comprises a microwave radar.

In a twelfth aspect, a method of controlling a vehicle performing a ground maintenance task is provided. The method includes propelling the vehicle in a forward direction over a ground surface, wherein the vehicle includes a chassis and a ground maintenance implement attached to the chassis. The method further includes: engaging the implement with the ground surface; monitoring a detection zone forward of the implement with a detection system comprising a transducer; detecting with the transducer an object at or near the ground surface that passes through the detection zone; and periodically capturing object information associated with the object while the object passes through the detection zone. The method also includes estimating, based upon the object information, a time period before the implement will reach the object, and issuing with the controller a disengage command to an implement engagement system to automatically raise, or otherwise disengage, the implement from the ground surface prior to the implement reaching the object.

In a thirteenth aspect according to the twelfth aspect, The method further includes issuing an engage command with the controller to the implement engagement system to re-engage the implement with the ground surface after the implement has traveled past the object. In a fourteenth aspect according to either the twelfth or thirteenth aspect, the detection system comprises two or more transducers each having a detection area. In a fifteenth aspect according to any one of the twelfth through fourteenth aspects, detecting the object comprises detecting a sprinkler head. In a sixteenth aspect according to any one of the twelfth through fifteenth aspects, detecting the object with the transducer comprises detecting the object using a microwave radar antenna. In a seventeenth aspect according to any one of the twelfth through fifteenth aspects, detecting the object with the transducer comprises detecting a radio frequency identification (RFID) tag associated with the object using an RFID antenna. In an eighteenth aspect according to the seventeenth aspect, capturing the object information comprises capturing and storing object information associated with the RFID tag, wherein the object information comprises, for each RFID tag read, any one or more of: an identity of the RFID antenna; a unique tag identifier; a time; a received signal strength indication (RSSI), a frequency channel of the RFID antenna; a phase shift between signals transmitted from and received by the RFID antenna; and a ground speed of the vehicle. In a nineteenth aspect according to the seventeenth aspect, the method further includes calculating, after the object is no longer detected within the detection zone, one or more tag statistics, the one or more tag statistics comprising any one or more statistics selected from: a presence time period during which the object was detected within the detection zone; a maximum received signal strength indication (RSSI) detected during the presence time period; a minimum RSSI detected during the presence time period; a standard deviation of RSSI detected during the presence time period; a time period between a first detection of the object and a time of the maximum RSSI; a time period between detection of the maximum RSSI and a last detection of the object; a linear distance travelled during which the object was detected; a linear distance travelled between the first detection and the time of the maximum RSSI; and a linear distance travelled between the time of the maximum RSSI and the last detection.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
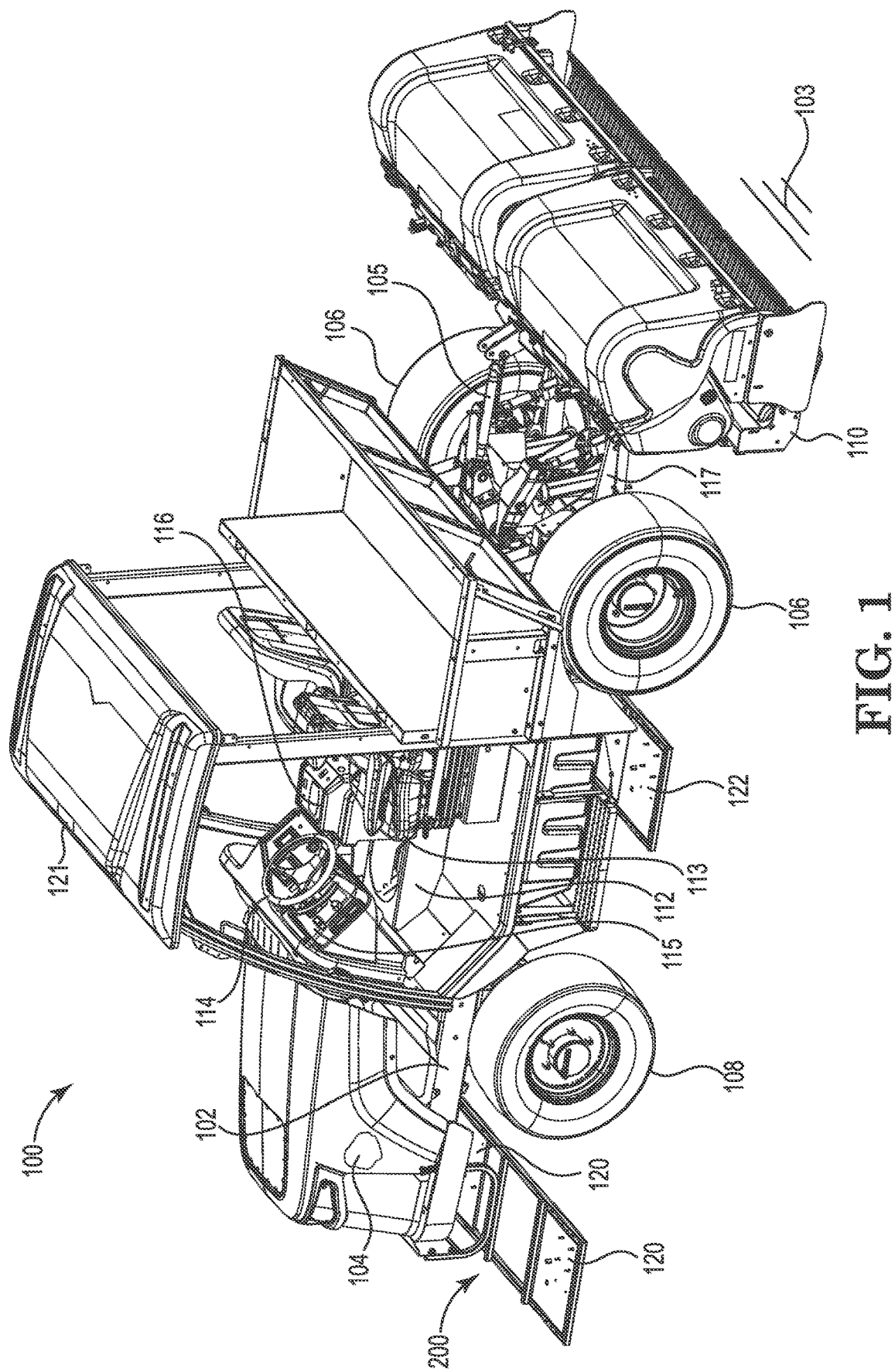
FIG. 1 is perspective view of an exemplary vehicle and corresponding ground maintenance implement incorporating an object detection system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings and sub-headings provided herein are for the convenience of the reader and should not be used to limit the meaning of any text that follows the heading or sub-heading unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about." The term "and/or" (if used) means one or all of the listed elements or a combination of any two or more of the listed elements. "I.e." is used as an abbreviation for the Latin phrase id est and means "that is." "E.g." is used as an abbreviation for the Latin phrase exempli gratia and means "for example."

Embodiments of the present disclosure are directed to detection systems and methods for detecting objects (e.g., irrigation sprinkler heads, boxes, and/or associated components) at, above, or below a ground surface (e.g., turf surface), and to powered ground maintenance vehicles incorporating the same. Other embodiments are directed to methods of controlling a vehicle performing a ground maintenance task. In some embodiments, the vehicle may include an attachment. The term "attachment" is used herein to refer to most any device or assembly that carries an implement or tool for performing a ground or turf maintenance operation.

As used herein, "object" may refer to any item located at, above, or below the ground surface that is susceptible to damage (or to causing damage) if the object comes into contact with the implement. For example, the object may be an irrigation sprinkler head. However, sprinkler heads are exemplary only as other objects, e.g., irrigation valve boxes, electrical (e.g. landscape) boxes, golf cups, drain tile outlets, utility valve access covers, and the like are also contemplated within the scope of the present disclosure.

As described herein, detection systems and methods in accordance with embodiments of the present disclosure may determine that the vehicle is on a path or course that will intersect the object. When this occurs, the detection system may issue a notification (e.g., disengage notification) indicative of a location of the object prior to the implement contacting, and possibly damaging, the object. In some embodiments, the notification (e.g., disengage notification) may include one or more of a visual, tactile, and/or audible notification to an operator of the vehicle instructing the operator to manually initiate disengagement (e.g., lifting) of the implement before it reaches the detected object.

In other embodiments, the vehicle may include an electronic controller as described herein that is adapted to communicate with the detection system, wherein the controller is adapted to issue the notification (e.g., the disengage notification). The controller may also monitor other vehicle parameters such as ground speed. With knowledge of the ground speed and other parameters such as a distance between a detection zone and the implement, the controller may calculate, during or after object (e.g., sprinkler head) detection, when the implement should be disengaged from the ground surface to avoid contact with the object. At the calculated time, the controller may then issue a notification (e.g., a command) to an implement engagement or "lift" system associated with the vehicle. The implement engagement system may connect the implement to a chassis of the vehicle, and may be adapted to selectively engage the implement with, and disengage the implement from, the ground surface. In some embodiments, the implement engagement system may automatically disengage the implement from the ground surface in response to receiving the disengage notification before the implement contacts the object. One exemplary turf vehicle in which a detection system and controller in accordance with embodiments of the present disclosure may be incorporated is the Outcross turf utility vehicle available from The Toro Company of Bloomington, Minnesota, USA. By incorporating detection systems and methods in accordance with embodiments of the present disclosure, such vehicles may be configured to automatically lift and lower its attachment/implement to avoid damage to either the object and/or the implement.

In still other embodiments, in addition to or instead of disengaging the implement from the ground surface, the controller could alternatively communicate with an autonomous navigation system associated with the vehicle. Such a configuration may allow the vehicle to effectively and autonomously re-route itself around, and thus avoid contact of the implement with, the detected object.

Regardless of whether the implement is automatically or manually disengaged from the ground surface, the detection system (and/or the vehicle controller) may also determine when the implement has moved beyond the object and issue an engage notification (e.g., to the operator or to the controller) that the implement can again be engaged with the ground surface. Alternatively, the implement may be re-engaged based merely upon the passage of a predetermined period of time for a given ground speed of the vehicle and object size. In still other embodiments, the detection system may be adapted to actively detect when the implement has moved past the object before re-engagement with the ground surface.

Thus, embodiments of the present disclosure may allow automatic or semi-automatic detection and implement avoidance of sprinkler heads and other ground surface or sub-surface objects during turf treatment, thus reducing potential head and/or implement damage and the corresponding time and cost associated with corresponding repairs.

Figure 2:
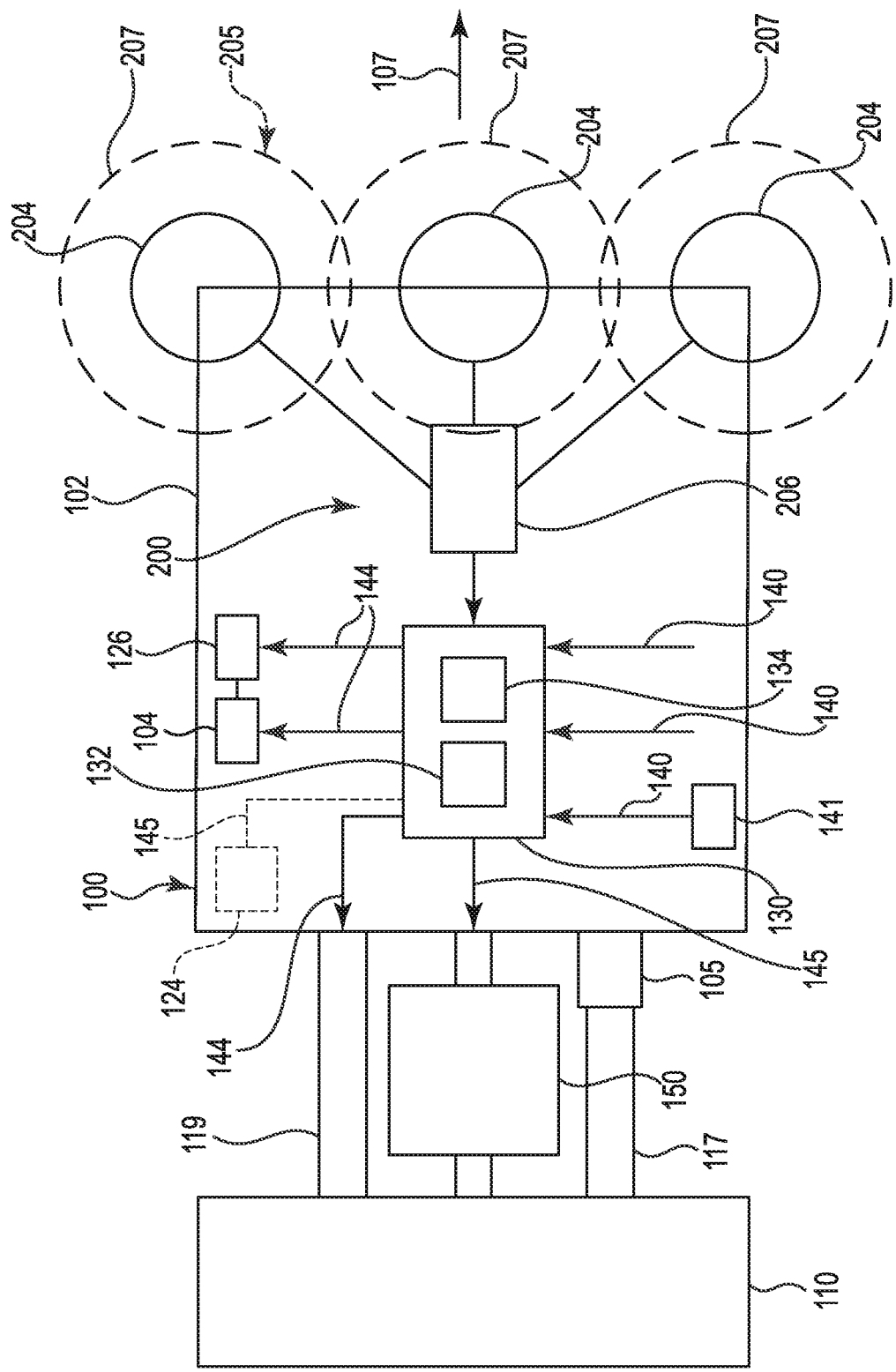
FIG. 2 is a diagrammatic view of an object detection system in accordance with embodiments of the present disclosure.

With reference to the figures of the drawing, FIG. 1 illustrates an exemplary vehicle 100 (with various structure removed) incorporating a detection system 200 in accordance with embodiments of the present disclosure, while FIG. 2 illustrates portions of the vehicle and detection system diagrammatically. As shown in these views, the vehicle 100 may include a chassis 102 supported upon a turf or ground surface 103 by one or more ground contact members (e.g., wheels, tracks, rollers, etc.) such as rear wheels 106 and front wheels 108. One or more of the front and rear wheels may form part of a traction drive system 126 adapted to propel the vehicle over the ground surface 103. A prime mover 104 may be attached to (or otherwise carried by) the chassis 102 near a front end of the vehicle as shown in FIG. 1. The prime mover 104 may power one or more of the wheels 106, 108 of the traction drive system 126 to propel the vehicle over the ground surface 103. The prime mover 104 (which may be configured as internal combustion engine, electric motor, or any other power source) may also power other vehicle systems and any vehicle attachments.

The chassis 102 may further define a riding platform defining an operator compartment 112 having a seat 113 adapted to support a sitting operator. The operator compartment 112 my include various vehicle controls, some of which are further described below. For instance, the operator compartment 112 may include accelerator and brake pedals to allow foot control of vehicle speed. A steering wheel 114 may also be provided to permit operator control of vehicle direction in a known manner. Other controls and indicators may be provided in the operator compartment 112, e.g., on a dashboard 115 or center console 116.

The vehicle 100 may further include an attachment system 105 connected to the chassis 102 to allow a ground maintenance implement to be carried by the chassis. The attachment system 105 is adapted to support an attachment 110 at a back end of the vehicle 100, although attachment systems capable of supporting attachments near a front or transverse side of the vehicle, as well as beneath the vehicle, are also contemplated. The attachment 110 may include an implement 111 defined by a plurality of coring tines 109

Figure 3:
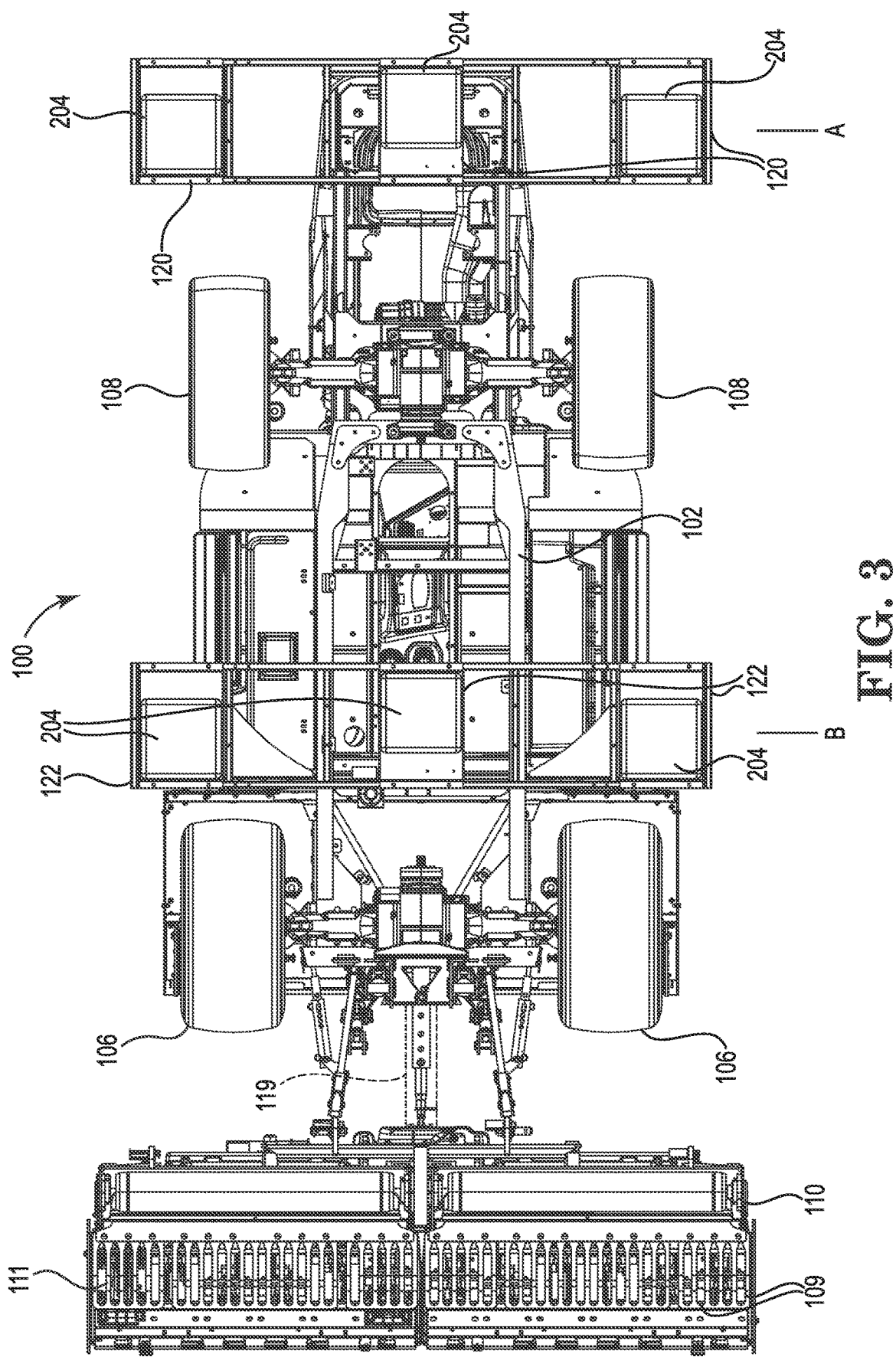
FIG. 3 is a bottom plan view of the vehicle of FIG. 1.

(see. FIG. 3) that form a turf aerator. While described as an aerator, attachments providing most any ground maintenance implement are contemplated within the scope of this disclosure. For example, attachments including cutting reels, rotary mower heads, rakes, spreaders, sprayers, dethatchers, etc. may be mounted to the vehicle via the attachment system 105 and controlled as described herein.

In some embodiments, the attachment system 105 may form a conventional three point linkage 117 carried at the rear of the chassis 102. The linkage 117 may include a top central link and a pair of lower laterally-spaced links that are pivotally connected to the chassis 102. The rear ends of the top and lower links have pivot connections for allowing various attachments to be mounted thereto either directly or through some type of quick-attach mounting system. One or more hydraulic cylinders (not shown) coupled to the three point linkage 117 and powered by a hydraulic system (also not shown) on the vehicle 100 allow the attachment/implement to be lowered to an engaged or working position (wherein the implement is engaged with the ground surface 103), and raised to a disengaged or transport position (wherein the implement is disengaged from the ground surface). A drawbar may also be provided at the rear of the chassis 102 to permit towing some types of attachments behind the vehicle 100.

While illustrated and described herein as lowering and lifting the attachment to engage and disengage, respectively, the implement from the ground surface, such a configuration is exemplary only as other implements may be engaged and disengaged by other actions, e.g., terminating power to the implement.

A power takeoff shaft (PTO) 119 (shown diagrammatically in FIG. 2 and in broken lines in FIG. 3) is also carried on the rear of the chassis 102. The PTO 119 provides a mechanical source of power (e.g., via the prime mover 104) that can be used to power or drive the attachment when mounted on the three point linkage 117. The PTO 119 can be manually engaged and disengaged by the operator using a PTO switch in the operator compartment (e.g., on the console 116 of FIG. 1) when operating some types of attachments. In addition to being manually controlled, the PTO 119 may be automatically engaged and disengaged by an electronic controller 130 (see FIG. 2) supported by the chassis 102.

Aspects of the exemplary vehicle 100 are further described in U.S. Pat. App. Pub. No. 2019/0389519. Moreover, while described as a general-purpose riding utility vehicle with a detachable implement, embodiments of the present disclosure may be equally applicable to walk-behind or stand-on vehicles, as well as vehicles configured with dedicated implements (e.g., stand-on aerators) without departing from the scope of this disclosure. Moreover, detection systems as described herein may find application to remote and autonomously controlled vehicles as well.

As shown in FIG. 2, the detection system 200 is adapted to monitor a detection zone 205 forward of the implement and detect an object at or near the ground surface 103 that passes through the detection zone as the vehicle 100 traverses the ground surface. For example, the detection system 200 may include one or more sensors or transducers 204 adapted to detect objects within a detection area 207 of the transducer. The transducers 204 may be located on the chassis 102 at positions that are forward (e.g., in the direction 107), lateral, and/or beneath the vehicle 100 and forward of the attachment 110 (implement 111). For example, as shown in FIG. 1, the transducers 204 may be located near the front end of the vehicle at locations 120. Alternatively, the transducers 204 may be located along the transverse sides of (and beneath) the vehicle generally at locations 122 (see also FIG. 3). Other locations may also be possible. For example, the transducers 204 could be attached directly to the implement housing itself.

Figure 4:
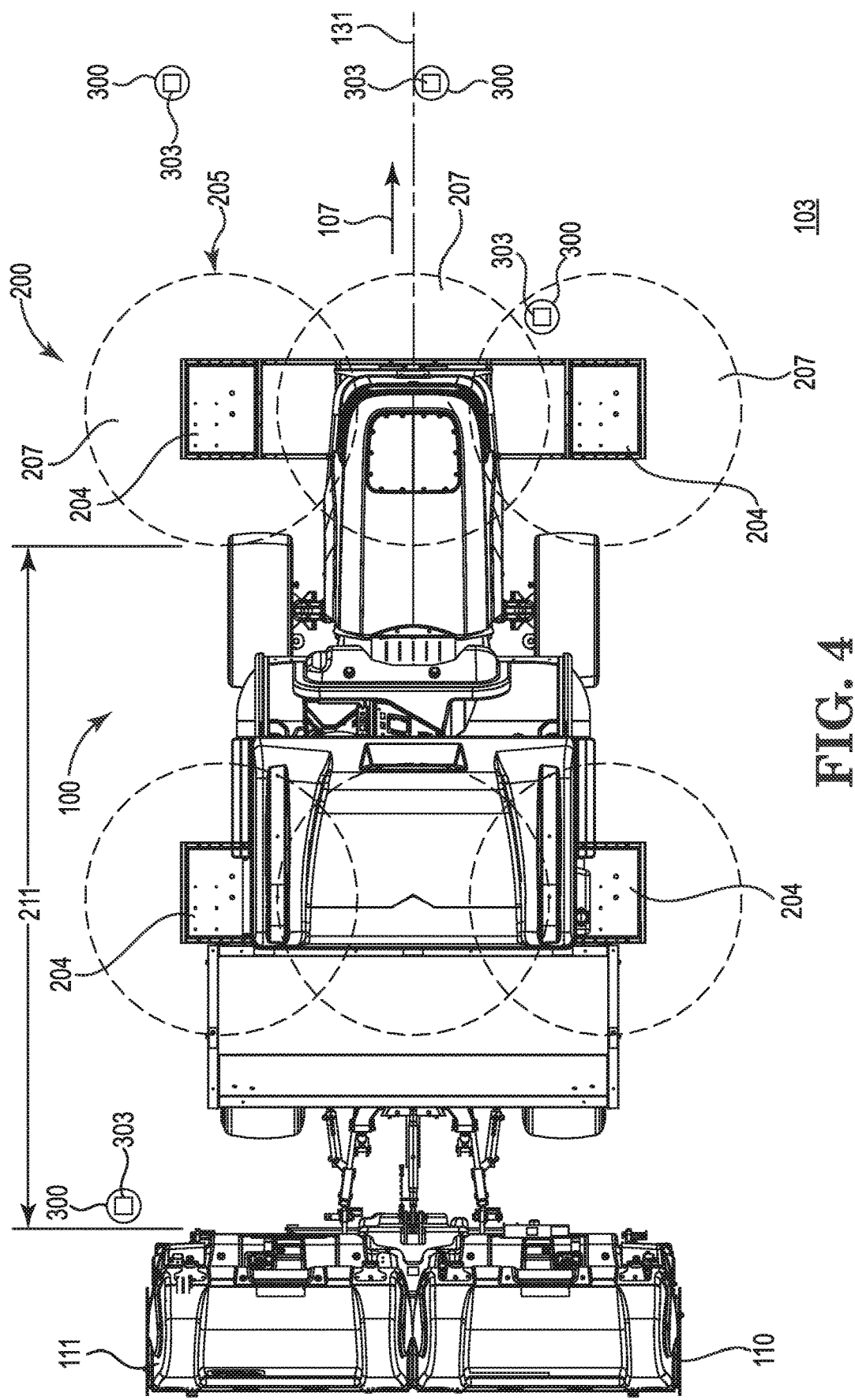
FIG. 4 is a top plan view of the vehicle of FIG. 1 operating in accordance with embodiments of the present disclosure.

The transducers 204 are capable of detecting objects, e.g., sprinkler heads 300, once the vehicle 100 is within a predetermined range of the heads (i.e., once the heads enters the detection zone 205). For example, as shown in FIG. 4, the detection system 200 may include the one or more transducers 204, which may be selected from: magnetic (magnetometer) transducers; radio frequency identification (RFID) or near field communication (NFC) transducers; vision-based transducers; microwave radar transducers; and real-time kinematic assisted GPS (RTK GPS) transducers. As used herein, "transducer" and "sensor" are used interchangeably to refer to any device, module, antenna, transmitter, receiver, transceiver, and associated components that permits detection and/or measurement of one or more parameters associated with a detected object (e.g., sprinkler head) and generation of electrical signals representative thereof.

In general, RFID technology uses radio waves to induce a current in a powerless "tag" 303 located on or near the object (e.g., attached to the sprinkler head 300) and optionally reads back information stored in that tag. A magnetometer, on the other hand, measures magnetic waves. Thus, by placing a known magnetic tag 303 on each sprinkler head 300, the head positions may be detected. Microwave radar, on the other hand, may determine a magnitude and frequency of an echo or return signal from the sprinkler head 300 and apply the Doppler shift principle to estimate a relative distance. While no tagging of the sprinkler head is required with microwave radar, some type of object (head) characterization may initially be required. The transducers 204 could also include digital imaging sensors adapted to utilize pattern recognition algorithms to detect the sprinkler head 300 location in sequential images. Finally, RTK GPS may utilize a map of the surrounding area wherein the locations of the objects, as well as the real-time position of the vehicle, are known.

Regardless of the transducer used, embodiments of the present disclosure may provide a detection system that can be placed upon the vehicle 100 (or upon the attachment or implement) to detect objects and initiate actions that minimize potential implement/object contact and resulting damage (e.g., by notifying the operator to initiate lifting or by automatically lifting the implement). After moving beyond the object, the implement may be commanded to resume normal operation by again lowering or otherwise engaging with the ground surface 103.

FIG. 2 is a partial diagrammatic representation of the vehicle 100 incorporating the exemplary detection system 200. As shown in this view, the vehicle may include the electronic controller 130 adapted to monitor and control various vehicle functions. The exemplary controller 130 may include a processor 132 and memory 134, where the processor 132 receives various inputs and executes one or more computer programs or applications stored in the memory 134. The memory 134 may include computer-readable instructions or applications that, when executed, e.g., by the processor 132, cause the controller 130 to perform various calculations and/or issue various commands. That is to say, the processor 132 and memory 134 may together define a computing apparatus operable to process input data and generate the desired output to one or more components/devices.

In addition to receiving inputs from the detection system 200, the controller may receive various other inputs regarding vehicle operation. For example, the controller may receive input or signal 140 from a ground speed sensor 141, such signal representative of a vehicle ground speed. Other inputs 140 may include signals or data regarding engine speed, engine temperature, operator control inputs such as pedal or steering wheel position, PTO switch position, paddle control 123 (see FIG. 10) position etc. Moreover, the controller 130 may transmit various commands and/or data to other vehicle systems and components. For instance, the controller 130 may transmit various commands to an implement engagement system 150 associated with the attachment system 105. Such commands may include a "lift" command to disengage the implement from the ground surface, and a "lower" command to return the implement to engagement with the ground surface. Of course, the controller 130 may provide other outputs 144 including, for instance, to vehicle control systems such as the traction drive system 126, to the PTO 119, to operator indicators, etc. In fact, in some embodiments, the controller may form part of a "drive-by-wire" system wherein various vehicle parameters and some or all operator inputs are provided to the controller and the controller generates appropriate outputs based thereon.

Accordingly, the controller 130 may be in communication with both the detection system 200 and the implement engagement system 150 and is adapted to receive object information and estimate a time, based upon vehicle ground speed, when the implement will reach the object. The controller is further adapted to issue the notification to disengage the implement from the ground surface before the implement contacts the object.

As further shown in FIG. 2, the detection system may include the transducers 204 as well as one or more associated electronic processing modules 206 adapted to store and process various information, including information from the transducers, and transmit resulting electrical signals to the vehicle controller 130. For example, when the detection system utilizes RFID technology, the transducers 204 may be RFID antennas that provide data to one or more processing modules 206. The processing module(s) 206 may then process the antenna data and generate electrical signals that are then provided to the controller 130. In this context, the vehicle controller 130 may form part of the detection system 200 or, alternatively, the detection system may include a controller separate from the controller 130.

The functionality of the controller 130 may be implemented in any manner known to one skilled in the art. For instance, the memory 134 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 130, the memory 134 and the processor 132 could be contained in separate modules.

The processor 132 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 132 may include multiple components, such as any combination of one or more microprocessors, one or more controllers, one or more DSPs, one or more ASICs, and/or one or more FPGAs, as well as other discrete or integrated logic circuitry. The functions attributed to the controller/processor herein may be embodied as software, firmware, hardware, or any combination thereof. In at least one embodiment, various subsystems of the vehicle 100 as described above could be connected in most any manner, e.g., directly to one another, wirelessly, via a bus architecture (e.g., controller area network (CAN) bus), or any other connection configuration that permits data and/or power to pass between the various components and systems of the vehicle.

FIG. 3 is a bottom plan view of the vehicle 100. As shown in this view and stated above, the detection system 200 may include an array of transducers 204 located forward of the implement, e.g., at a front end of the vehicle (location "A"), or longitudinally between the front a rear wheels 108, 106 (location "B").

FIG. 4 is a top plan view of the vehicle 100 of FIG. 3 during operation of the implement over the ground surface 103, the latter containing sprinkler heads 300 at various locations. As shown in this view, the detection system 200 (e.g., transducers 204) may continuously scan for sprinkler heads 300 that enter into the detection zone 205. To minimize contact of the implement 111 with the heads 300, the detection zone 205—in addition to being located forwardly of the implement—also preferably extends laterally outboard past a width of the implement.

By tracking each head 300 as it moves through the detection zone 205, the detection system 200 may determine if the head 300 is within the path of the moving implement. If the head 300 is within the path, the system 200 may (e.g., via the controller 130) issue a disengage notification, e.g., disengage command 145, as shown in FIG. 2. As stated above, the disengage notification may be provided to the implement engagement system 150 to command the system 150 to automatically raise or otherwise disengage the implement from the ground surface 103 before contact of the implement with the object/head. After the implement has moved past the detected head 300 (which passage may be estimated based upon speed of the vehicle and passage of a corresponding period of time), the controller may command the implement engagement system 150 to automatically lower or otherwise engage the implement with the ground surface (e.g., return the implement to its ground-engaging, operating position).

While systems and methods described herein may have application to various ground maintenance attachments/implements and corresponding detection of different ground surface or sub-surface objects, the following exemplary embodiments are described in the context of a turf core aerator 110 and a detection system 200 adapted to detect, and avoid damage to, sprinkler heads 300 associated with an underground irrigation system. Thus, the terms "aerator," "implement," and "attachment" may be used interchangeably herein, as may the terms "object," "head," and "sprinkler head."

Ultra-High Frequency RFID

In some embodiments, ultra-high frequency (UHF) RFID (e.g., in the 900-915 megahertz (MHz) range) may be used to detect a tag 303 (see. FIG. 4) attached or otherwise associated with each of the sprinkler heads 300. The tags may include a generic identifier, or each tag/head combination may be uniquely tied to its particular geographic location.

Figure 5:
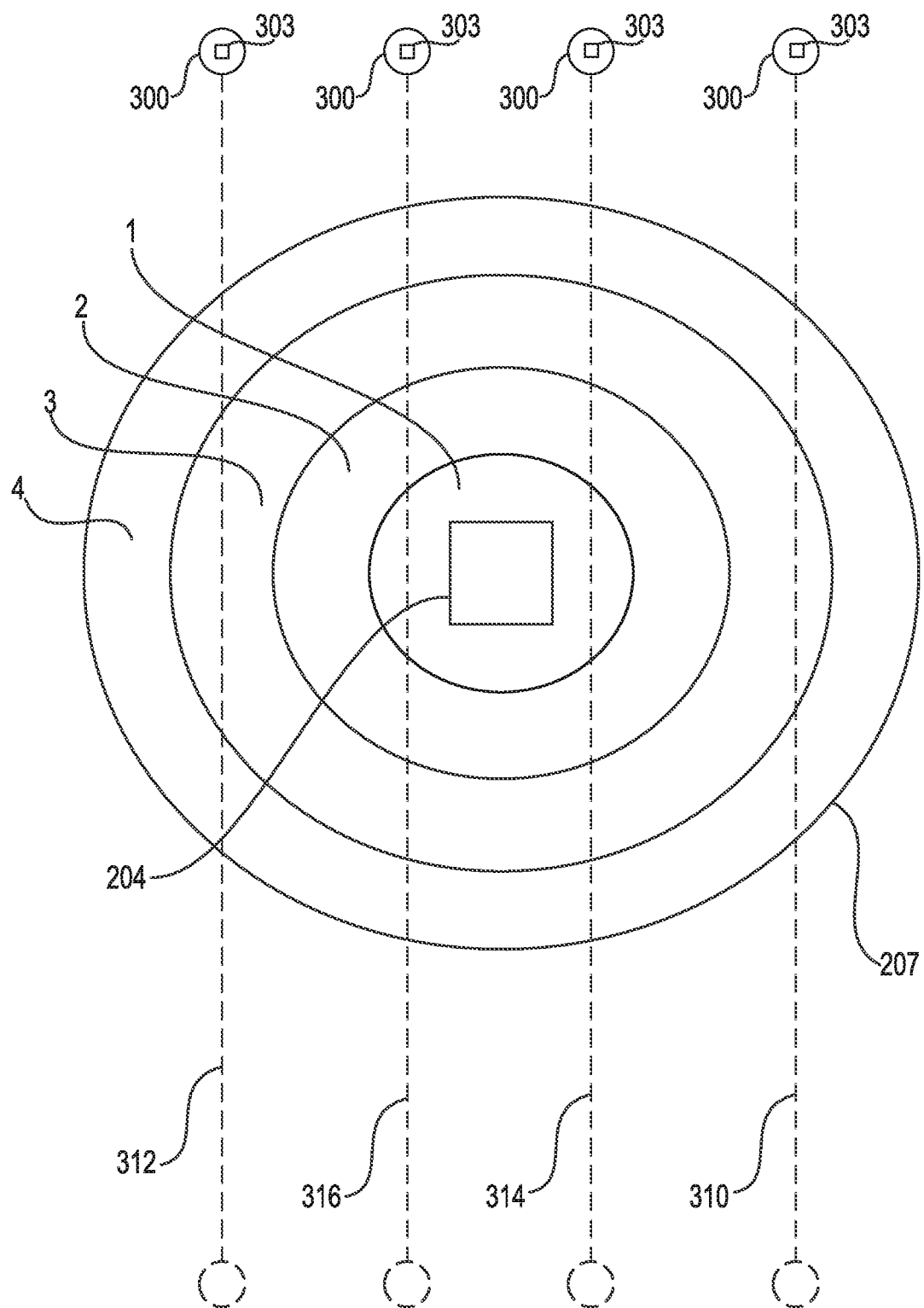
FIG. 5 illustrates an exemplary process of detecting objects within a detection area of a radio frequency identification (RFID) antenna.

Each RFID transducer or antenna 204 may be located at a forward location on the vehicle chassis 102 as shown in FIGS. 1-4 and be directed downwardly (perpendicular to the ground surface 103). In the embodiment illustrated in FIG. 4, a three transducer array may locate an antenna near the vehicle centerline 131, and antennas on each transverse side thereof. As a result, each antenna 204 may create an independent detection area 207 at the ground surface that is generally circular or oblong in shape as shown in FIG. 5, wherein an effective diameter of the detection area 207 is dependent on the elevation of the antenna 204 above the ground surface 103. The combined areas 207 may form the detection zone 205 as shown in FIG. 4. As illustrated, the three-antenna RFID array detection zone 205 may have detection areas 207 that overlap one another to improve coverage and detection capability as further described below. As indicated in FIG. 2, the antennas 204 may each provide data to the RFID processing module 206 which, in turn, may communicate with the controller 130. It is noted that, while three antennas 204 are illustrated, embodiments using one, two, or four or more antennas are also contemplated.

As used herein, the term "forward" may be used to refer to the location of the detection zone relative to the operational direction of the implement. Accordingly, the transducers and detection zone may be forward of the implement when the vehicle moves in a forward direction (direction 107 in FIG. 4) during implement operation. However, the transducers and detection zone could, in other embodiments, be actually "behind" the implement where the implement is intended to operate when the vehicle moves in a reverse direction without departing from the scope of this disclosure.

During aeration, the vehicle 100 may be propelled forwardly (e.g., in a forward direction 107 at a rate of 0.4 meters/second (m/s) to 1.2 m/s (e.g., 0.9 miles/hour (mph) to 2.7 mph)). During this forward motion of the vehicle, each antenna 204 of the detection system 200 may continuously scan for tags 303. When one of the antennas detects a tag 303, the system may compare the received signal strength indication (RSSI) to a "fingerprint" database of values stored within a memory of the processing module.

By observing changes in tag information over time, and by monitoring which antennas 204 detect the tag 303, the detection system 200 may estimate a location of the tag 303, and thus the sprinkler head 300 relative to the vehicle/implement and determine whether the tag/head is in the path of the travelling aerator 110. As stated above, the detection system 200 may then communicate with the vehicle controller (see, e.g., controller 130 in FIG. 2), which, as stated above, may also receive the signal representative of vehicle ground speed. The detection system, via the controller 130, may then, based upon the vehicle ground speed and the tag information detected by the antenna(s), calculate when the head 300 may otherwise make contact with the aerator 110 and issue a disengage notification to command the implement engagement system 150 to automatically lift the aerator at the appropriate time to avoid contact with the sprinkler head 300.

After the implement has passed the sprinkler head, the controller 130 may issue an engage notification to command the implement engagement system 150 to lower the aerator 110. In some embodiments, the command may be issued after a predetermined (or calculated) period of time has elapsed, e.g., based upon the speed of the vehicle. In other embodiments, the same or different transducers 204 may actively detect when the aerator 110 has moved past the sprinkler head and inform the controller 130, after which the aerator may again be lowered.

FIG. 5 illustrates an exemplary detection area 207 for one of the antennas 204. As described below, tag information detected by the antenna 204 may allow the detection system 200 to estimate where the sprinkler head 300/tag 303 is at any given time within the respective detection area 207. For example, based upon the identifier information, the detection system 200 may determine that a tag is entering the detection area 207, e.g., entering an outer range or "ring" 4 of the detection area. On the next read, the tag may be estimated (e.g., based upon RSSI) to lie within ring 3 inboard of ring 4. If subsequent readings remain in ring 3 and ultimately again in ring 4, the detection system 200 can determine that relative path or movement of the tag 303/head 300 is along an outer periphery of the detection area 207 as indicated by either line 310 or line 312. That is, by analyzing a sequential series of tag readings, the particular location of the head path relative to the antenna 204 may be generally identified in this instance as being either along line 310 or line 312. Similarly, if the readings show passage of the tag from ring 4 to ring 3 and then through rings 2 and 1, the timing of the readings and the identifier information may be used to indicate that relative movement of the tag is, for example, generally along either line 314 or 316. Note that while the detection area 207 is illustrated herein with four distinct ranges or rings, such an embodiment is for illustration purposes only, e.g., any number of "rings" are contemplated. Of course, other tag information (e.g., signal phase shift, etc.) may also be used to estimate tag/head location and movement through the detection area 207.

Figure 6:
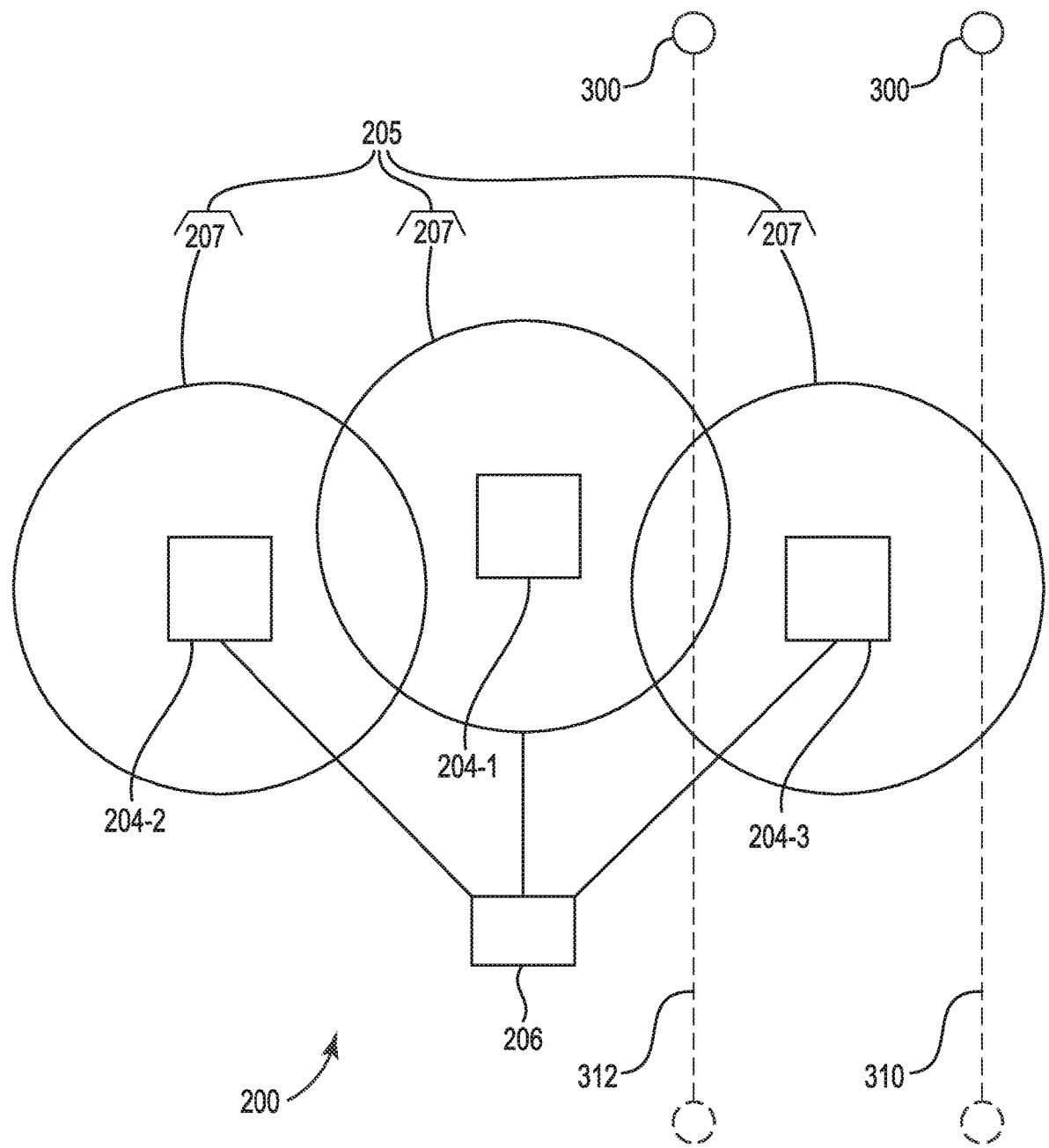
FIG. 6 illustrates an RFID antenna array in accordance with embodiments of the present disclosure.

As one can appreciate, estimating a position of the tag/head relative to a single antenna 204 may be insufficient to determine if the head is within the path of the aerator 110. For instance, as shown in FIG. 6, based upon sequential readings, the right antenna 204-3 may be unable to determine if the path of the head 300 is laterally outboard of the antenna (represented by line 310 in FIG. 6), or laterally inboard (line 312) as the tag identifier information may be similar. If passing along the outboard side (line 310), raising of the aerator 110 may be unnecessary as the head 300 will pass laterally beyond the aerator. However, if the head is passing along the inboard side of the detection area 207 (along line 312) of antenna 204-3, the head may lie within the path of the aerator 110.

To determine which head/tag path is correct, detection from the other antennas (represented in FIG. 6 as center antenna 204-1 and left antenna 204-2) may be used. For instance, if the head 300 moves along the path 312, antenna 204-1 will also read the head/tag passing through its detection area 207. In fact, with the overlap of the two detection areas, any head 300 may be detected within two detection areas 207 simultaneously. However, if the path of the head/tag is instead along line 310, antenna 204-1 (as well as antenna 204-2) will not register the tag. In this case, the detection system 200 can accurately determine that path 310 is the actual head path.

Once the relative tag path is identified by sequential tag reads, the processing module 206 may inform the vehicle controller 130 (see FIG. 2) as to when the tag is no longer detected, indicating that the tag/head has now passed completely through the relevant detection areas 207. Based upon this event, the controller 130 may determine, based upon vehicle speed and distance 211 (see FIG. 4) from the detection zone 205 to the aerator 110, when to issue a disengage notification commanding the implement engagement system 150 to disengage the aerator from the ground surface. Moreover, the controller 130 may, after the aerator 110 has moved past the head, issue the engage notification automatically commanding the implement engagement system to re-engage the aerator with the ground surface.

Figure 7:
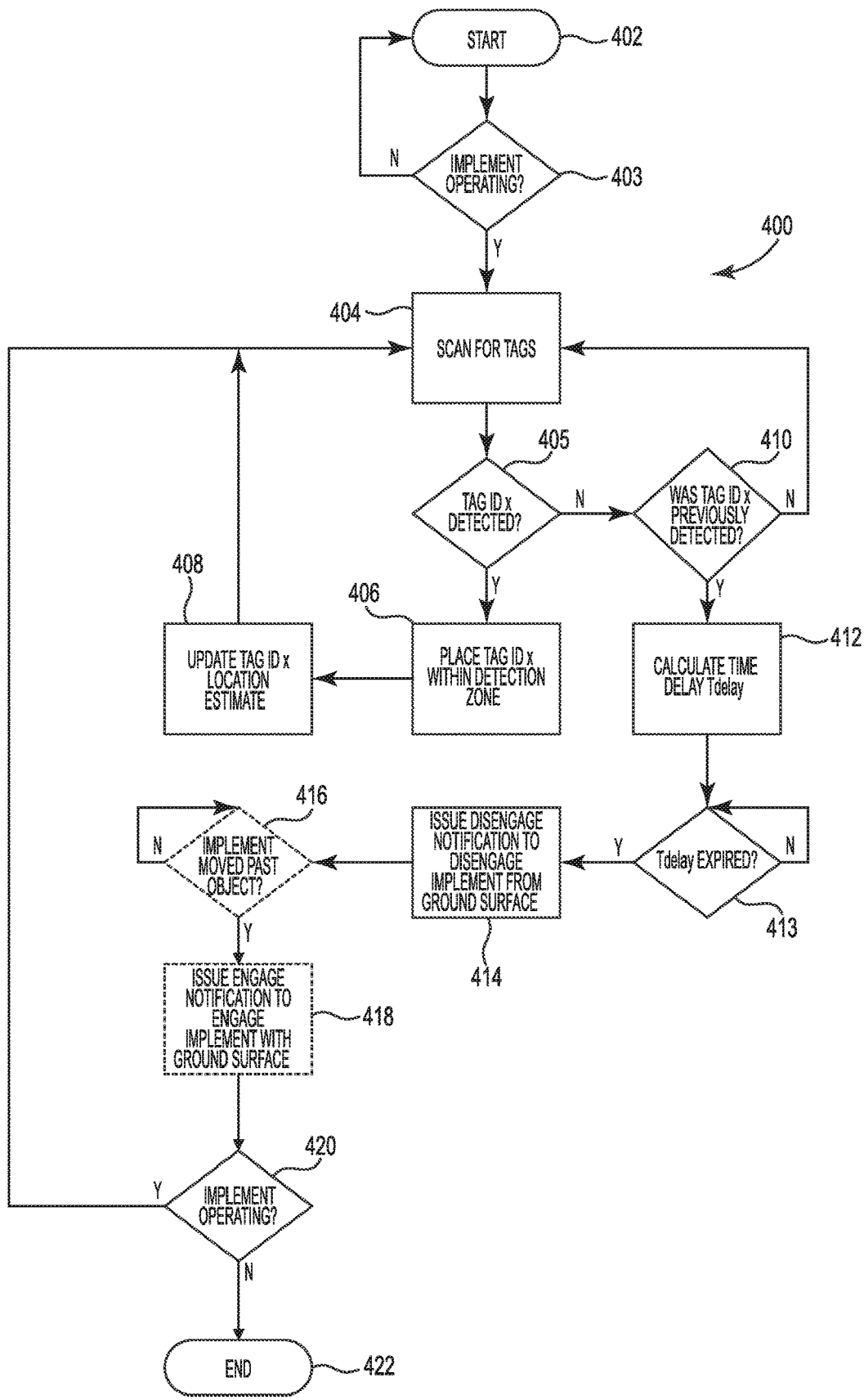
FIG. 7 is a flow chart illustrating a method of operating a vehicle having an RFID detection system in accordance with one embodiment of the present disclosure.

FIG. 7 illustrates an exemplary process 400 for operating the vehicle 100 using the method described with reference to FIGS. 5-6. The process is entered at 402. Once the implement is determined to be operating and engaged with the ground surface as determined at 403, the vehicle may be propelled in a forward direction (see, e.g., direction 107 in FIG. 4) over the ground surface 103. The transducers (antennas 204) may monitor the detection zone 205 forward of the implement by scanning for tags 303 at 404. If a tag (e.g., "tag ID x") is detected at 405 (e.g., the tag passes through the detection zone), the detection system 200 may estimate or "place" the tag within one of the ranges (see, e.g., rings 1-4 in FIG. 5) of the tag's detection area 207 of the detection zone 205 at 406. The estimated location of the tag 303 may be updated at 408, e.g., based upon changes in tag identifier information, detection by other antennas 204, etc., after which control returns to 404.

If no tag is detected at 405, the detection system 200 may determine whether the tag ID x was previously detected at 410. If tag ID x was not previously detected, control returns to 404. If, on the other hand, tag ID x was previously detected at 410 (indicating that the tag has moved entirely through the relevant detection area 207 of the specific antenna 204), the detection system 200 and/or the vehicle controller 130 may calculate, based upon a ground speed of the vehicle 100 and the distance 211 from the detection zone to the aerator, the time delay (Tdelay) to expire before the aerator should be lifted to avoid damage to the sprinkler head at 412. Once Tdelay has expired at 413, the controller 130 may issue a disengage notification (e.g., a command to the implement engagement system (e.g., system 150 of FIG. 2) to disengage or lift the implement/aerator from the ground surface) at 414. The process 400 may then optionally determine whether the implement has moved past the object/sprinkler head at 416. If yes, then the detection system (via the controller 130) may issue an engage notification (e.g., a command to the implement engagement system 150 to engage or lower the implement/aerator to the ground surface) at 418. Assuming the aerator is still operating as determined at 420, control is returned to 404. If the aerator is deactivated (e.g. no longer operating) at 420, the process ends at 422.

As indicated above, the process 400 of FIG. 7 may rely on associating tag location (relative to a particular antenna) using the fingerprint database. While not wishing to be bound to any particular embodiment, the fingerprint database may be empirically populated (e.g., prior to vehicle operation) by logging tag data at various locations around a specific antenna and recording the tag information (e.g., RSSI, frequency, phase) at those corresponding locations. Machine learning algorithms may then be used to generate a decision tree that calculates the location (e.g., what range 1-4 in FIG. 5) of the tag relative to that antenna.

Figure 8:
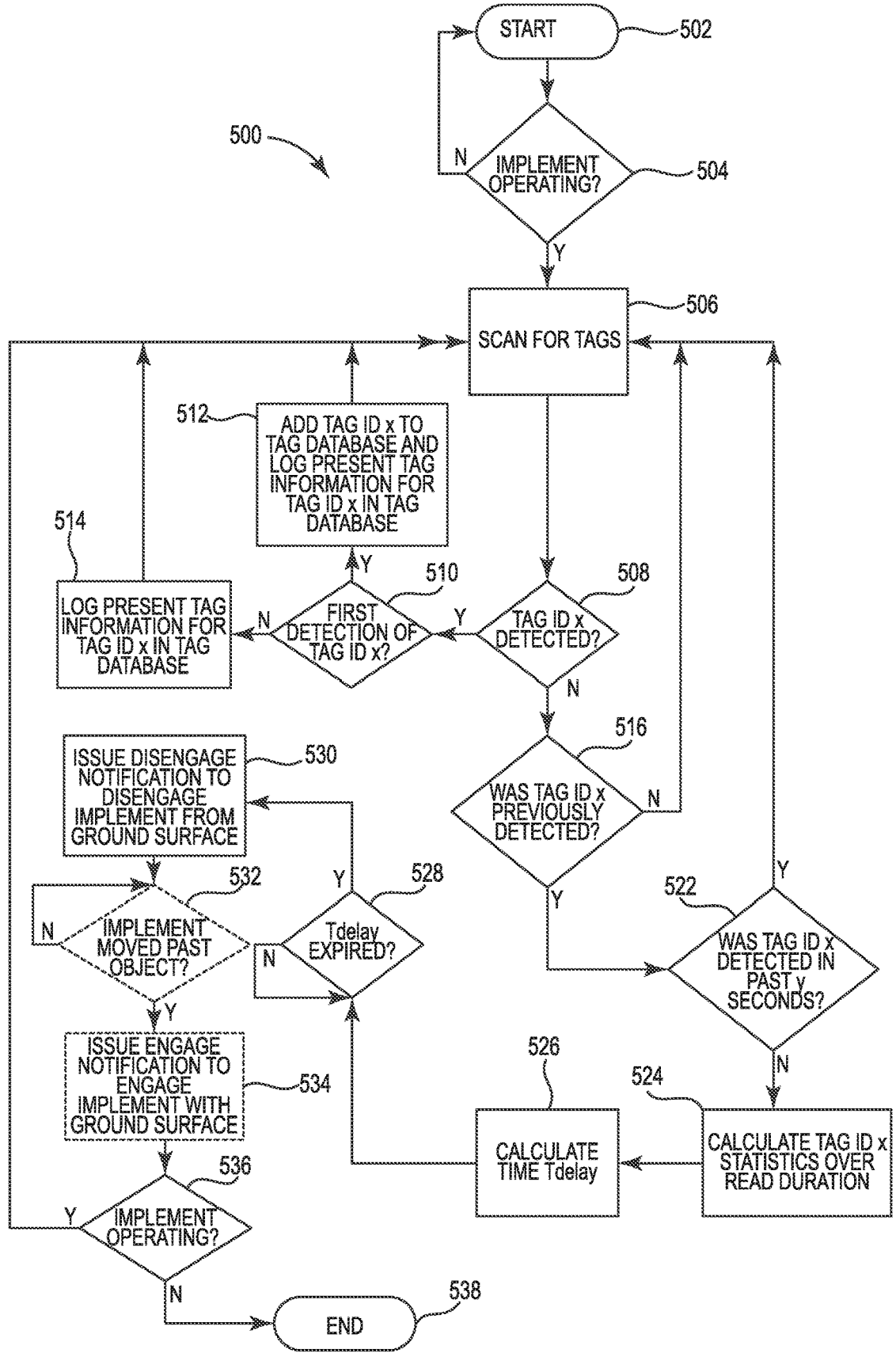
FIG. 8 is a flow chart illustrating a method of operating a vehicle having an RFID detection system in accordance with another embodiment of the present disclosure.

While effective, accuracy of such methods may depend somewhat on specific tag orientation relative to the antenna(s) at time of read. Accordingly, variability in implement disengagement (lift) timing calculations may occur. To address such issues, an alternative process 500 for operating the vehicle 100 is illustrated in FIG. 8. The process 500 may use the same vehicle 100 and RFID antenna array as already described herein. However, tag movement paths may be better estimated by evaluating additional tag information (e.g., in place of the fingerprint database) as indicated below.

The process 500 is entered at 502. Upon determining that the implement is operating and engaged with the ground surface 103 at 504 (e.g., engagement of the powered aerator with the ground surface), the vehicle may be propelled in the forward direction over the ground surface and the detection system 200 may begin monitoring the detection zone 205 for objects (e.g., scan for sprinkler heads 300/RFID tags 303) at 506 using the transducers (RFID antennas 204). If a particular object/tag (tag ID x attached to a sprinkler head) is detected or "read" via one of the antennas at 508 (e.g., if an object is detected passing through the detection zone), the detection system may then determine if this is the first detection of tag ID x at 510. If so, then the detection system may add tag ID x to a tag database and further log present tag information for tag ID x into the tag database at 512, wherein control then returns to 506. If, on the other hand, the system determines at 510 that it is not the first detection of tag ID x (i.e., tag ID x is already in the tag database), present tag information for tag ID x may be logged into tag database at 514, after which control again returns to 506.

As used herein, the phrase "first detection" of a tag (tag ID x) refers to the first detected tag reading upon entrance of tag ID x into the detection zone. Once tag ID x has exited the detection zone, any subsequent reading of tag ID x would be registered as another first detection. Further as used herein, the term "tag database" refers to a data set that includes tag IDs and their associated tag (object) information for tags that are currently detected (including, as described below, those that are not currently detected, but were detected within a previous period of time indicating passage of the tag through the detection zone is complete).

While not an exhaustive list, "tag information" (also referred to herein as "object information") may include for each tag reading, any one or more of: an identity of the specific detecting antenna; a unique tag identifier; a time (of the tag reading); a received signal strength indication (RSSI); a frequency channel of the detector/antenna; a phase shift between signals transmitted from and received by the detector/antenna; and a ground speed of the vehicle (as provided by the sensor 141 of FIG. 2 to the controller 130).

If tag ID x is not detected at 508, the process 500 may next determine whether tag ID x was previously detected at 516. If not, control is returned to 506. If, however, it is determined that tag ID x was previously detected at 516, the process may determine if the tag was detected in the pasty seconds at 522. If tag ID x was detected in the last y seconds, control may return to 506. If, on the other hand, the determination at 522 is that tag ID x has not been detected in the past y seconds, the detection system may calculate various object or tag statistics for tag ID x over the read duration at 524. As one can appreciate, the detection system may thus be adapted to periodically capture (e.g., at each tag read) object or tag information associated with the object (sprinkler head) while the object remains in the detection zone.

The value of y used at 522 may be selected to ensure that a missing detection of tag ID x is not due to external factors such as radio interference or lack of detection at a certain antenna frequency. Exemplary values of y may range from 0.5 seconds (sec) to 1 sec. For instance, 0.75 seconds has been found sufficient to allow for a potential missed detection without erroneously concluding that the tag has passed through the detection zone.

While not exhaustive, the tag statistics calculated at 524 may include any one or more of: a presence time period during which the tag/object was detected within the detection zone (the time period that the tag/object was within the detection zone); a maximum RSSI detected during the presence time period; a minimum RSSI detected during the presence time period; a standard deviation of RSSI detected during the presence time period; a time period between a first detection of the object and a time of the maximum RSSI; a time period between detection of the maximum RSSI and a last detection of the object; a linear distance travelled during which the object was detected; a linear distance travelled between the first detection and the time of the maximum RSSI; and a linear distance travelled between the time of the maximum RSSI and the last detection.

With knowledge of current vehicle speed and certain vehicle parameters (the latter including, for instance, the distance 211 (see FIG. 4) and the time required to disengage (e.g., lift) the implement from the ground surface), the vehicle controller 130 may estimate a time period before the implement will reach the object. Based upon this estimate, the controller may calculate a delay time "Tdelay" to expire before implement disengagement from the ground surface 103 is needed to avoid object contact at 526. Once Tdelay has expired at 528, the detection system (e.g., controller 130) may issue a disengage notification to disengage the implement from the ground surface at 530.

While Tdelay may vary (e.g., for different implements, different vehicle configurations, different vehicle speeds, etc.), it is in some embodiments selected to ensure that the implement may continue to operate until it is close to the object without resulting in contact of the implement with the object.

Figure 10:
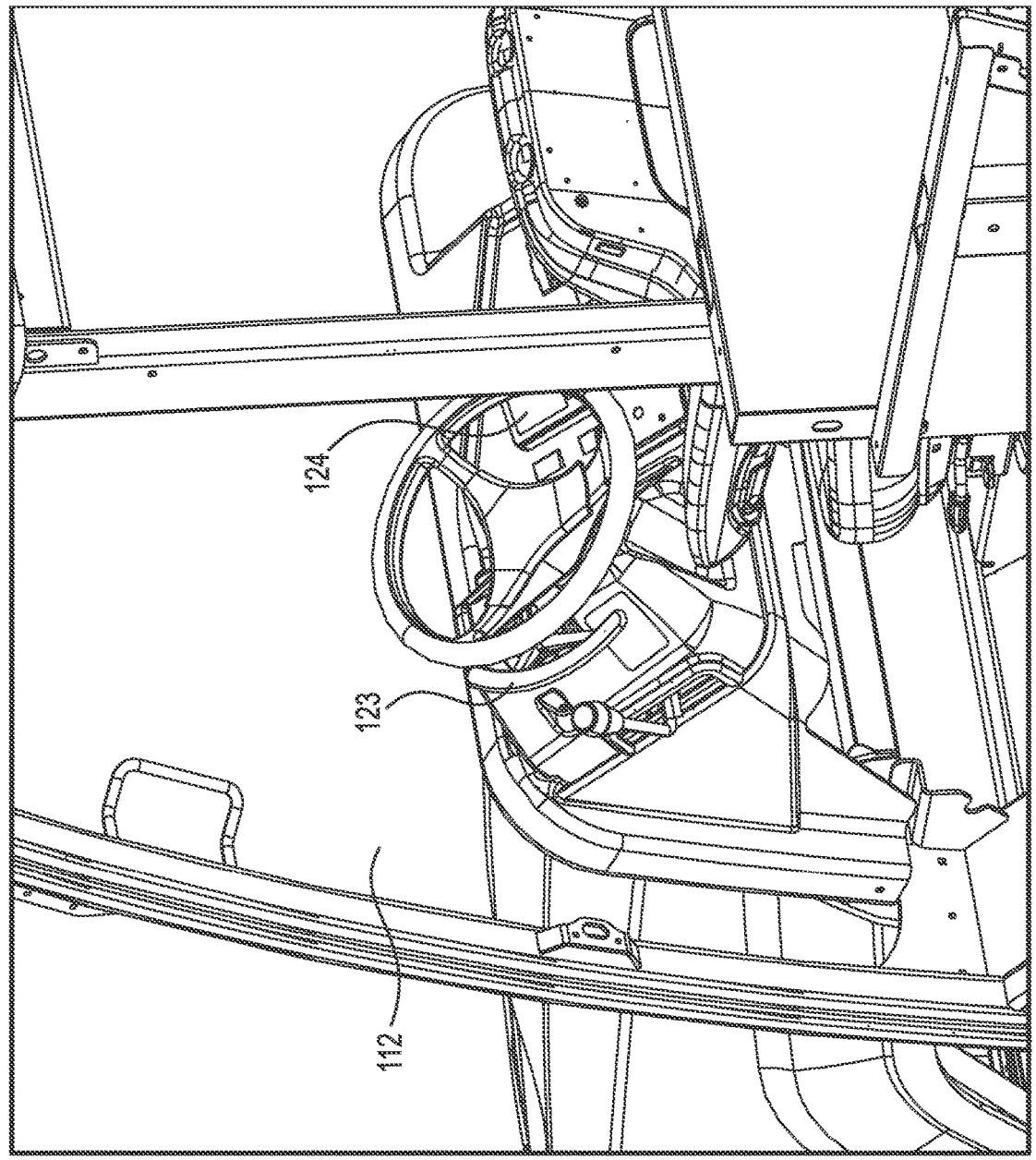
FIG. 10 is a perspective view of portion of an operator compartment of the vehicle of FIG. 1.

In some embodiments, the disengage notification may be a command or signal 145 transmitted to the implement engagement system 150 (see FIG. 2) that causes the implement to automatically raise or otherwise disengage from the ground surface 103 at the appropriate time (e.g., prior to the implement reaching the object). In other embodiments, the disengage notification 145 could be a visual, tactile, and/or audible alert provided to the operator control console (e.g., to a display 124 as shown in FIGS. 2 and 10). Upon receipt of such notification, the operator could manually disengage the implement from the ground surface using the paddle control 123 (FIG. 10) as further described below.

In some embodiments, the process 500 may include additional steps 532 and 534 as shown in FIG. 8. More specifically, in addition to issuing the disengage command or notification to disengage the implement from the ground surface, the detection system (e.g., controller 130) may also determine when the implement is clear of or has moved past the object at 532 and issue an engage command or notification to engage or re-engage the implement with the ground surface at 534. After 534, the process may return to 506 or end at 538 depending on whether the implement is determined to still be operating at 536.

As with the implement disengage notification, the implement engage notification may be automated such that the implement automatically re-engages the ground surface after the implement has cleared the object. For example, the engage notification may be a signal transmitted to the lift system 150 that automatically lowers the implement at the appropriate time. In some embodiments, the engage notification may be sent at a specific time following the disengage notification, such time being fixed or variable based upon vehicle speed and/or other parameters. In yet other embodiments, transducers (e.g., another set of RFID antennas) could be provided to monitor the area behind the implement and issue the engage notification once the object/tag is detected as being past (behind) the implement. In still yet other embodiments, the engage notification could be provided to the operator, at which point the operator could manually command the implement to re-engage with the ground surface.

Microwave Radar

Like the RFID methods described above, other embodiments may use radar to detect objects such as sprinkler heads, and even buried objects, and inform the vehicle operator of (or automatically lift the implement/aerator to avoid contact with) the head/object when the latter is determined to be within the oncoming path of the aerator. Radar detection may include the added benefit of head avoidance without the need to first affix tags or other targets to the sprinkler heads.

Figure 9:
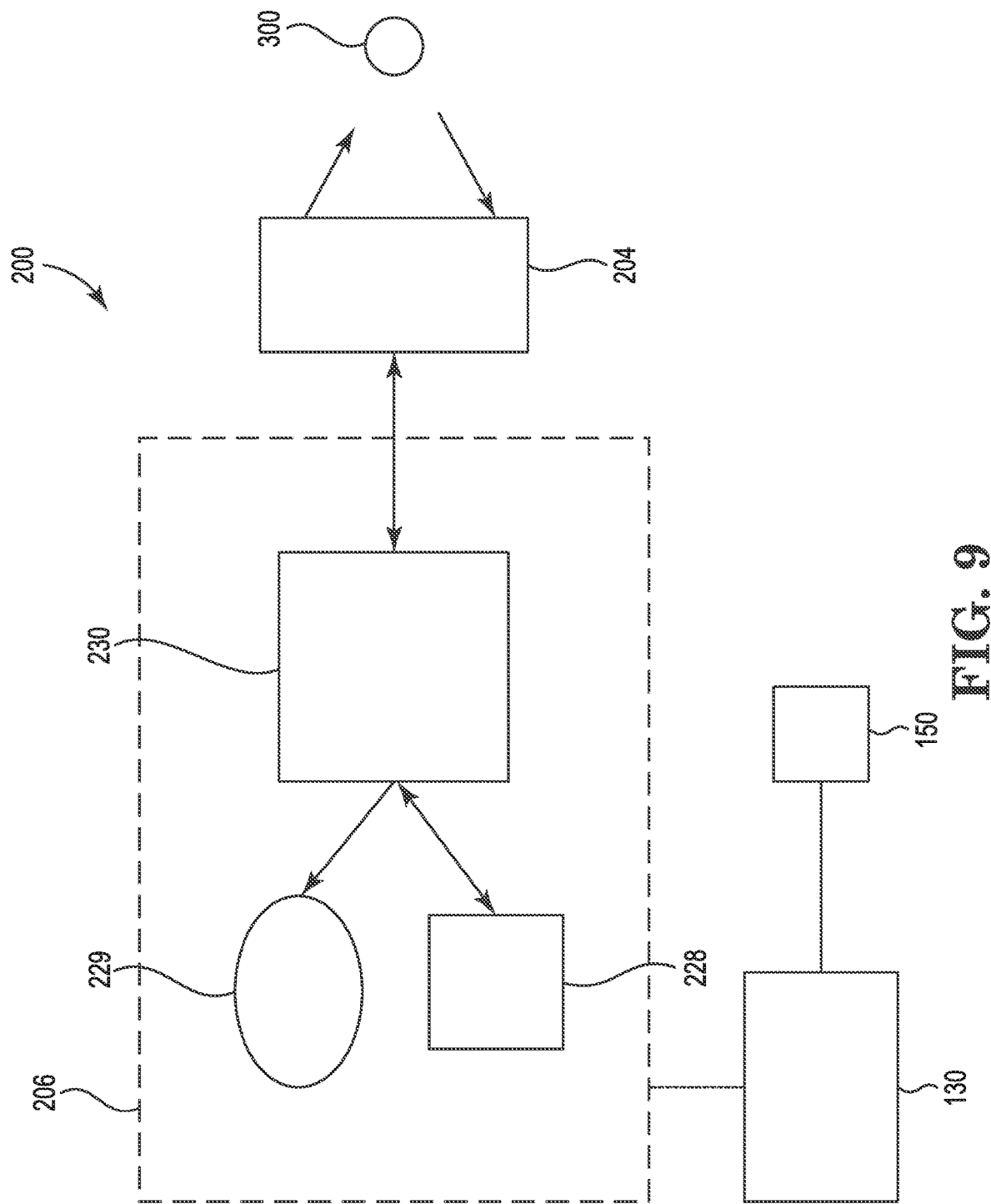
FIG. 9 is a diagrammatic view of an exemplary microwave radar detection system.

For example, in some embodiments, the detection system 200 may include a microwave radar having a transmitting/receiving antenna 204 as shown in FIG. 9 that is adapted to transmit energy in the microwave frequency band range of 300 MHz to 300 Gigahertz (GHz) (e.g., X-band frequency of 8 GHz to 12 GHz) corresponding to a range of wavelengths of 1 meter (m) to 1 millimeter (mm), respectively. With such a transmission source, the detection system 200 may rely upon the principle of Doppler shift to estimate location of objects (e.g., sprinkler heads) that are within the approaching path of the aerator 110. As is known in the art, "Doppler shift" refers to a change in frequency or wavelength of a wave in relation to a detector/observer that is moving relative to the wave source.

Accordingly, detection systems 200 utilizing microwave radar may utilize antennas 204 that emit energy at the frequency and range described above and measure a reflected magnitude and frequency of the return signal (e.g., the Doppler shift). The magnitude of the Doppler shift is proportional to the reflection of transmitted energy, and the frequency of the Doppler shift is proportional to velocity of the object relative to the vehicle 100/antenna 204. This relationship may be mathematically expressed as shown in Equation 1 below.

$$F_d = 2*(v/c)*F_t*\text{Cos}(a) \quad \text{(Equation 1)}$$

Wherein:
 $F_d$=Doppler reflected ("echo") frequency;
 v=Velocity of the target (e.g., velocity of the vehicle relative to the object);
 c=Speed of light (constant of $3\times10^8$ meters/second (m/s));
 $F_t$=Transmission frequency of the transducer/antenna; and
 a=Angle between the relative movement direction of the object and an axis of the radar antenna module.

In operation, the Doppler radar antenna 204 may be mounted on top of the vehicle 100 (e.g., at a location 121 in FIG. 1). The antenna may transmit microwave energy forwardly in, for example, the 10.525 GHz X-band. Materials of different permittivity (dielectric constant) will reflect energy magnitude and frequency data back to the Doppler radar antenna. Accordingly, sprinkler heads will provide a different radar reflection than the surrounding turf.

As indicated in FIG. 9, data from the detected object (sprinkler head 300) is received by the radar antenna 204. These data may be fed into a machine learning (ML) software environment 230, which may run within a processing module 206 (or in the controller 130), to do inference of neural network (NN) artificial intelligence (AI) models on embedded systems for finding patterns and rules in the data. These inferred data may be stored in memory 228 for post-detail analysis and compared to a local library 229 of object identification information for machine control (MC). The processing module 206 may, like the RFID processing module described above, be in communication with the implement engagement system 150 by way of the vehicle controller 130. Accordingly, like the RFID detection system described above, the microwave radar detection system may identify sprinkler heads 300 and issue notifications or commands (e.g., using the vehicle controller 130) to the implement engagement system 150 to reduce or eliminate unintended contact of the aerator 110 with the heads 300.

Manual and Semi-Automated Control

While embodiments above describe automating implement lift, detection systems 200 are also contemplated for use with vehicles that do not include a vehicle controller (e.g., the controller 130) that can automate such tasks. In such instances, the detection system 200 may simply notify the operator, via audible, tactile, or visual cues to raise the implement at the appropriate time. For example, FIG. 10 is a partial perspective view of the exemplary operator compartment 112 of the vehicle 100. As shown in this view, the operator compartment 112 may include various controls including the paddle control 123 as well as one or more displays 124. As it lacks the controller 130, the disengage notification at 530 in FIG. 8 may be a visual notification to the display 124, wherein such notification provides red, green, and yellow lights. Upon detection of a sprinkler head having passed through the detection zone as already described herein, the notification may change from green to yellow to indicate an approaching head and to initiate implement lift. As more time elapses, the light may change to red, indicating that the head is beneath the aerator and that the aerator should not be lowered. Once sufficient time has passed, the light may change again to green, indicating that the aerator may again be lowered and operated.

In some embodiments, the operator may respond to the disengage notification (e.g., yellow light) by pulling on the paddle control 123. Such manipulation of the paddle control may cause the implement disengagement system 150 to lift the implement. In a similar manner, the display 124 may also display the engage notification identified at 534 in FIG. 8 (e.g., using the green light). Upon observance of the engage notification, the operator may push on the paddle control 123, causing the implement engagement system 150 to once again lower or otherwise engage the implement with the ground surface.

In the case of vehicles lacking a vehicle controller, the notifications may occur without knowledge of vehicle ground speed. Accordingly, the notifications may be configured to safely indicate lift assuming a relatively high ground speed and indicate implement lowering assuming a slow ground speed. While such operation may avoid aerator coverage of desired areas around the heads, it may also lessen the opportunity for sprinkler head contact/damage.

Figure 11:
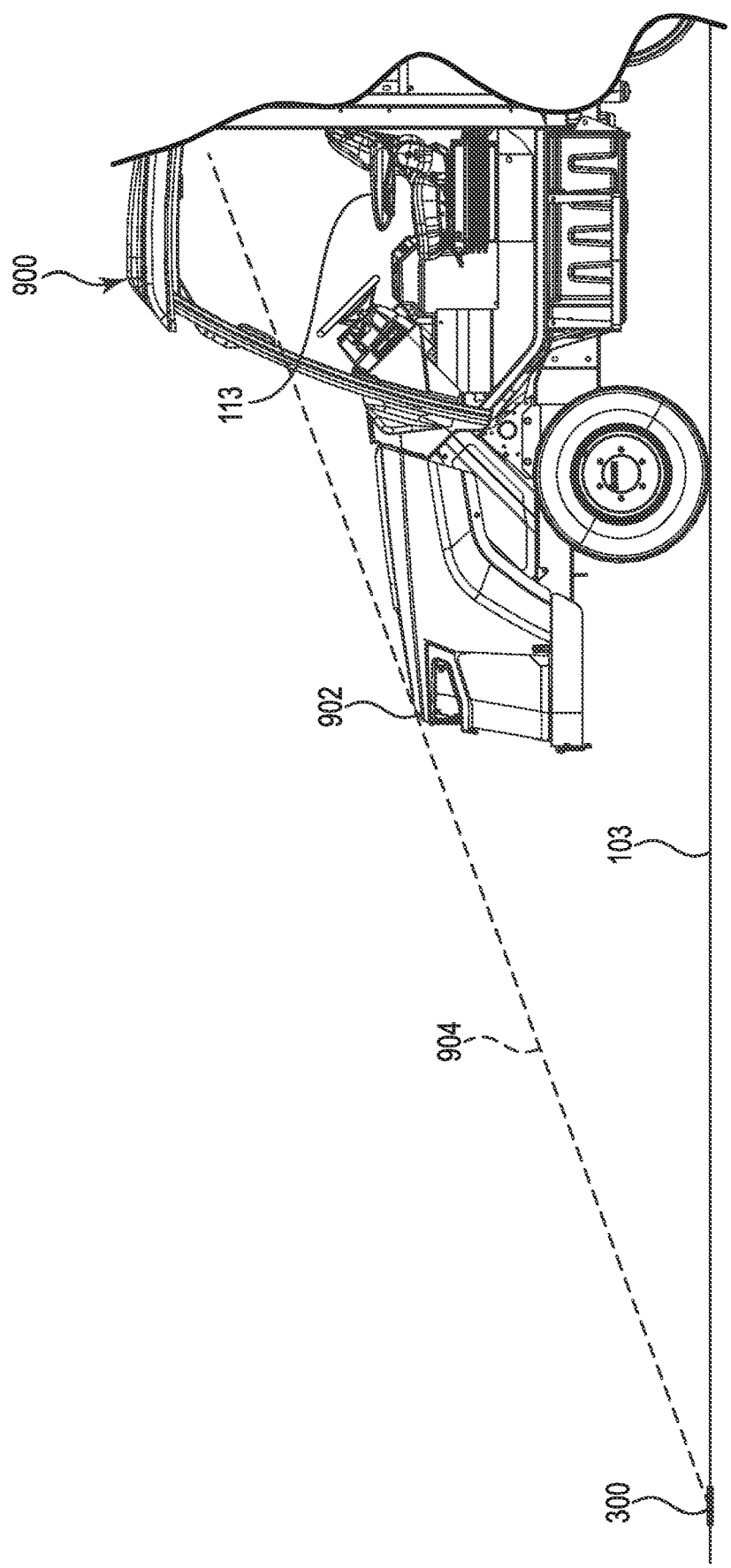
FIG. 11 is a partial side elevation view of a vehicle illustrating a manual or semi-automated detection method in accordance with embodiments of this disclosure.

In still other embodiments, the vehicle may lack the detection systems described herein, but include the vehicle controller 130. In such embodiments, reliance on operator observance and manual operator initiation of disengage/engage commands may be necessary. For example, FIG. 11 illustrates a partial side view of a vehicle 900 similar in most respects to the vehicle 100 described above but lacking the associated detection system. Prior to operation of the implement (not shown), the operator may calibrate his or her line of sight 904 through a site 902 attached to the vehicle (e.g., attached to an edge of the vehicle hood). Such calibration may occur by, for example, adjusting the site or a height of the operator's seat 113. During operation, alignment of the object 300 with the site 902 (along the operator's line of sight 904) may serve as a disengage notification to the operator to disengage the implement from the ground surface. The operator may then trigger a control (e.g., pull on the paddle control 123) indicating the presence of the object 300.

As the line of sight 904 corresponds to a particular distance between the object 300 and the implement, the controller 130 may be configured (e.g., programmed by the particular end user) to start a delay timer upon actuation of the paddle control 124. After this delay timer expires, the controller 130 may send a disengage command to the system 150 to raise the implement. The delay timer may be set to ensure the implement remains engaged with the ground surface for as long as possible (based upon vehicle speed) and then lifted before contact with the object 300. As with other embodiments described herein, the controller 130 may also be configured to lower the implement at the appropriate time (e.g., after the expiration of a time period) to again engage the implement with the ground surface once the implement has passed the object.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A powered ground maintenance vehicle comprising:
   a chassis supported upon a ground surface by ground contact members;
   a prime mover attached to the chassis;
   a traction drive system powered by the prime mover and adapted to selectively power one or more of the ground contact members to propel the vehicle over the ground surface;
   a ground maintenance implement carried by the chassis;
   an implement engagement system connecting the implement to the chassis, the engagement system adapted to selectively engage the implement with, and disengage the implement from, the ground surface;
   a detection system comprising a Radio Frequency Identification (RFID) antenna adapted to monitor a detection zone forward of the implement and detect an RFID tag associated with an object passing through the detection zone as the vehicle traverses the ground surface, wherein the detection system is further adapted to periodically capture object information associated with the object while the object remains in the detection zone; and
   an electronic controller adapted to communicate with the detection system, wherein the controller is adapted to receive the object information and estimate a time, based upon vehicle ground speed, when the implement will reach the object, and wherein the controller is further adapted to issue a notification to disengage the implement from the ground surface before the implement contacts the object.

2. The vehicle of claim 1, wherein the controller is adapted to issue the notification to the implement engagement system, and wherein the implement engagement system is adapted to automatically raise or otherwise disengage the implement from the ground surface before contact of the implement with the object.

3. The vehicle of claim 2, wherein the controller is adapted to issue an engage notification to the implement engagement system to automatically lower or otherwise engage the implement with the ground surface after the implement passes the object.

4. The vehicle of claim 1, wherein the implement comprises a turf aerator.

5. The vehicle of claim 1, wherein the object comprises an irrigation sprinkler head.

6. A method of controlling a vehicle performing a ground maintenance task, the method comprising:
propelling the vehicle in a forward direction over a ground surface, the vehicle comprising a chassis and a ground maintenance implement attached to the chassis;
engaging the implement with the ground surface;
monitoring a detection zone forward of the implement with a detection system comprising a first and a second Radio Frequency Identification (RFID) antenna;
detecting with both the first and second RFID antennas an RFID tag located on or near an object at or near the ground surface that passes through the detection zone, wherein the first and second RFID antennas define first and second detection areas, respectively, that together form the detection zone;
periodically capturing, with both the first and second RFID antennas, object information associated with the object while the object passes through the detection zone;
determining a relative location of the object within the detection zone via the object information captured by both the first and the second RFID antennas;
estimating, based upon the object information, a time period before the implement will reach the object; and
issuing with a controller a notification to disengage the implement from the ground surface prior to the implement reaching the object.

7. The method of claim 6, wherein the notification to disengage the implement is a disengage command issued to an implement engagement system to automatically raise, or otherwise disengage, the implement from the ground surface, and the method further comprises issuing an engage command with the controller to the implement engagement system to re-engage the implement with the ground surface after the implement has traveled past the object.

8. The method of claim 6, wherein detecting the object comprises detecting a sprinkler head.

9. A method of controlling a vehicle performing a ground maintenance task, the method comprising:
propelling the vehicle in a forward direction over a ground surface, the vehicle comprising a chassis and a ground maintenance implement attached to the chassis;
engaging the implement with the ground surface;
monitoring a detection zone forward of the implement with a detection system comprising a Radio Frequency Identification (RFID) antenna;
detecting with the RFID antenna an RFID tag located on or near an object at or near the ground surface that passes through the detection zone;
periodically capturing, with the RFID antenna, object information associated with the object while the object passes through the detection zone;
estimating, based upon the object information, a time period before the implement will reach the object; and
issuing with a controller a disengage command to an implement engagement system to automatically raise, or otherwise disengage, the implement from the ground surface prior to the implement reaching the object;
wherein capturing the object information comprises capturing and storing object information associated with the RFID tag, wherein the object information comprises, for each RFID tag read, any one or more of: an identity of the RFID antenna; a unique tag identifier; a time; a received signal strength indication (RSSI); a frequency channel of the RFID antenna; a phase shift between signals transmitted from and received by the RFID antenna; and a ground speed of the vehicle.

10. The method of claim 9, further comprising calculating, after the object is no longer detected within the detection zone, one or more tag statistics, the one or more tag statistics comprising any one or more statistics selected from: a presence time period during which the object was detected within the detection zone; a maximum received signal strength indication (RSSI) detected during the presence time period; a minimum RSSI detected during the presence time period; a standard deviation of RSSI detected during the presence time period; a time period between a first detection of the object and a time of the maximum RSSI; a time period between detection of the maximum RSSI and a last detection of the object; a linear distance travelled during which the object was detected; a linear distance travelled between the first detection and the time of the maximum RSSI; and a linear distance travelled between the time of the maximum RSSI and the last detection.

* * * * *